(12) United States Patent
Nonen

(10) Patent No.: US 10,168,490 B2
(45) Date of Patent: Jan. 1, 2019

(54) COMMUNICATION MODULE

(71) Applicant: Hitachi Metals, Ltd., Minato-ku, Tokyo (JP)

(72) Inventor: Hideki Nonen, Mito (JP)

(73) Assignee: Hitachi Metals, Ltd., Tokyo (JP)

(*) Notice: Subject to any disclaimer, the term of this patent is extended or adjusted under 35 U.S.C. 154(b) by 10 days.

(21) Appl. No.: 15/643,774

(22) Filed: Jul. 7, 2017

(65) Prior Publication Data
US 2018/0013236 A1 Jan. 11, 2018

(30) Foreign Application Priority Data

Jul. 11, 2016 (JP) .................................. 2016-136648

(51) Int. Cl.
*G02B 6/38* (2006.01)
*G02B 6/42* (2006.01)
*H01R 13/627* (2006.01)
*H01R 13/633* (2006.01)

(52) U.S. Cl.
CPC ......... *G02B 6/3893* (2013.01); *G02B 6/4292* (2013.01); *H01R 13/6275* (2013.01); *H01R 13/6335* (2013.01)

(58) Field of Classification Search
CPC .............. H01R 13/6335; H01R 13/627; H01R 13/6273; H01R 13/6275; H01R 13/629; H01R 13/633; G02B 6/3893; G02B 6/428; G02B 6/4292

USPC ....... 385/139, 53, 74–92, 134; 439/352–357, 439/372, 483, 489
See application file for complete search history.

(56) References Cited

U.S. PATENT DOCUMENTS

| | | | | |
|---|---|---|---|---|
| 2010/0087084 A1* | 4/2010 | George | ............. | H01R 13/6275 439/352 |
| 2011/0268390 A1* | 11/2011 | Yi | ........................ | G02B 6/4201 385/50 |
| 2015/0117812 A1* | 4/2015 | Brooks | ................ | G02B 6/4225 385/14 |

FOREIGN PATENT DOCUMENTS

JP 5254852 B2 8/2013

* cited by examiner

*Primary Examiner* — Michael Mooney
(74) *Attorney, Agent, or Firm* — Crowell & Moring LLP

(57) ABSTRACT

A communication module inserted into and removed from a slot provided in a communication device, the communication module includes a communication cable, a casing disposed at an end of the communication cable and capable of being inserted into and removed from the slot, a latch arm slidable along the casing, and a grip portion extending from the casing. When the latch arm is operated so as to slide, an engagement between the casing and the slot is released, and the grip portion is connected to the latch arm such that the latch arm can be operated so as to slide, and the grip portion also has rigidity so as not to be bent by a weight of the casing.

5 Claims, 5 Drawing Sheets

COMMUNICATION MODULE

CROSS-REFERENCE TO RELATED APPLICATION

The present application claims priority from Japanese Patent Application No. 2016-136648 filed on Jul. 11, 2016, the content of which is hereby incorporated by reference into this application.

TECHNICAL FIELD OF THE INVENTION

The present invention relates to a communication module through which optical signals or electric signals are input and output.

BACKGROUND OF THE INVENTION

There are cases where communication devices and transmission apparatuses (hereinafter collectively referred to as "communication devices") such as network switches and servers are connected to other communication devices via communication cables. For example, a communication module provided at one end of a communication cable is connected to one communication device, and a communication module provided at the other end of the communication cable is connected to the other communication device. To be specific, one communication module is inserted in a slot provided in a front panel, a rear panel, or the like of one communication device, and the other communication module is inserted in a slot provided in a front panel, a rear panel, or the like of the other communication device. The communication module inserted in each slot is connected to a connector provided at an end of the slot. In the following description, the front panel, the rear panel, or the like of the communication device, provided with the slot for insertion or removal of the communication module may be collectively referred to as a "panel" in some cases.

Pull tabs are provided on casings of some communication modules, and when the pull tab is pulled by pinching an end of the pull tab, the communication module is pulled out from the slot.

In contrast, when a communication module is inserted into the slot, the communication module is inserted therein by pinching its casing. In many cases, a tip of a thumb is placed on one side surface of the casing, and then, a tip of an index finger is placed on the other side surface of the casing to pinch the casing from both sides.

However, a plurality of slots are provided adjacent to each other in the panel. Accordingly, in an attempt to insert a communication module into a slot, another communication module has already been inserted in a slot adjacent to this slot, in some cases. Under such circumstances, the existing communication module which have been inserted in the adjacent slot become an obstacle, and it may be difficult or impossible to insert the communication module to be newly installed into the intended slot by pinching the casing thereof. Therefore, the communication module may be inserted into the slot by holding the communication cable extending from the casing rearward, instead of the casing. (Japanese Patent No. 5254852)

SUMMARY OF THE INVENTION

The end of the communication cable is connected to a board or the like in the casing. For example, a board is accommodated in the casing, and a signal line and a ground line of a communication cable are soldered to pads on the board. Accordingly, when the communication module is inserted into the slot with the communication cable held with a hand, a force is applied to a connection portion between the communication cable and the board, and the connection portion may be damaged. For example, when the signal line or the ground line of the communication cable is soldered to the pad on the board, the pad may be peeled from the board, or bonding between the signal line and the ground line, and the pad, may be destroyed.

In addition, a conventional pull tab has flexibility. Hence, when communication modules have been inserted in a plurality of slots adjacent to each other, the pull tab may be bent or twisted by the communication cables extending from the surrounding communication modules. In this case, it is difficult or impossible to pull the pull tab straight.

The problem as described above becomes more remarkable as arrangement density of the slots in the panel becomes higher.

An object of the present invention is to achieve a communication module which can be easily inserted in and removed from slots adjacent to each other.

A communication module of the present invention is a communication module inserted into and removed from a slot provided in a communication device, and the communication module includes a communication cable, a casing disposed at an end of the communication cable and capable of being inserted into and removed from the slot, a latch arm slidable along the casing, and a grip portion extending from the casing. According to the communication module of the present invention, when the latch arm is operated so as to slide, an engagement between the casing and the slot is released. In addition, the grip portion is connected to the latch arm such that the latch arm can be operated so as to slide, and the grip portion also has rigidity so as not to be bent by a weight of the casing.

According to an aspect of the present invention, the grip portion is made of metal and is integrally molded with the latch arm.

According to another aspect of the present invention, the grip portion is made of synthetic resin and is fixed to the latch arm.

According to another aspect of the present invention, the grip portion has a round bar shape smaller than the communication cable in diameter.

According to another aspect of the present invention, the grip portion has a length such that a protruding length of the grip portion with respect to a panel provided with the slot is 50 mm or more when the casing is inserted into the slot.

According to another aspect of the present invention, a width of the grip portion is narrower than a width of the casing and narrower than a diameter of the communication cable.

According to the present invention, a communication module which can be easily inserted in and removed from slots adjacent to each other is achieved.

BRIEF DESCRIPTIONS OF THE DRAWINGS

DESCRIPTIONS OF THE PREFERRED EMBODIMENTS

Figure 1:
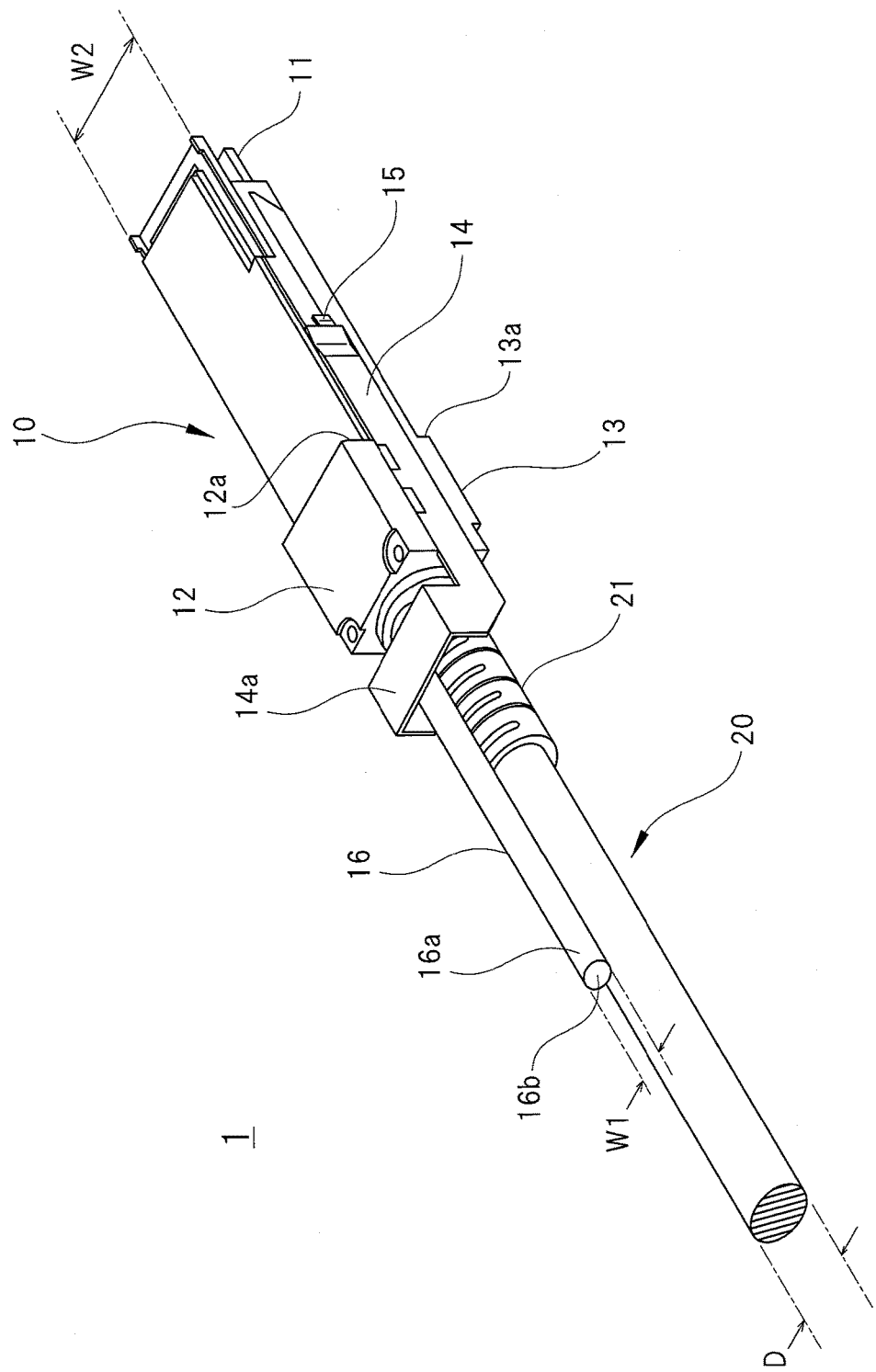
FIG. 1 is a perspective view showing an example of a communication module to which the present invention is applied.

Hereinafter, an example of an embodiment of the present invention will be described. As shown in FIG. 1, a communication module 1 according to the present embodiment is a communication module referred to as a "direct attach cable" conforming to QSFP+, and includes a casing 10 constituting a connector module, and a communication cable (metal cable) 20 connected to the casing 10. The communication module 1 is inserted into and removed from a slot (sometimes referred to as a "cage") provided in a communication device such as a server or a network switch, and connects communication devices with each other. In FIG. 1, only the casing 10 to which one end of the communication cable 20 is connected is illustrated, but actually, the other end of the communication cable 20 is also connected to a similar casing.

The slot provided in the communication device is disposed on aboard (host board) of the communication device. The slot is formed in a box shape by using a sheet metal and communicates with an outside of the communication device through an opening disposed in a panel of the communication device. The communication module 1 (casing 10) is inserted into the slot through the opening in the panel and is pulled out from the slot through the opening.

The communication module 1 includes a plug connector 11 as a module connector, and a receptacle connector inside the slot. When the communication module 1 is inserted into the slot, the plug connector 11 is fitted to the receptacle connector, and both are connected. That is, the communication module 1 and the communication device are connected.

A semiconductor chip for communication is mounted on the host board of the communication device, and the communication module 1 connected to the communication device is connected to the semiconductor chip for communication via electrical wiring formed in the host board. In addition, a plurality of slots are disposed on the host board so as to be vertically and horizontally adjacent to each other, and openings corresponding to the respective slots are disposed in the panel.

The casing 10 of the communication module 1 is made of metal and has a shape and dimensions so as to be capable of being inserted into and removed from the slot. The casing 10 has a substantially rectangular parallelepiped appearance as a whole, and a pair of protrusions 12 and 13 is disposed on one end side in the longitudinal direction thereof. To be specific, the protrusion 12 is disposed on an upper side (front side) of the casing 10, and the protrusion 13 is disposed on a lower side (back side) of the casing 10. In the following description, the protrusion 12 may be referred to as an "upper protrusion 12," and the protrusion 13 may be referred to as a "lower protrusion 13," in some cases.

The communication module 1 (casing 10) is inserted into the slot until an end surface 12a of the upper protrusion 12 and an end surface 13a of the lower protrusion 13 abut on the periphery of the slot (a front surface of the panel of the communication device). In other words, the upper protrusion 12 and the lower protrusion 13 define an insertion length of the communication module 1 (casing 10) with respect to the slot.

The above-described plug connector 11 protrudes from one end face of the casing 10 in the longitudinal direction, and one end of the communication cable 20 is drawn into the casing 10 from the other end face of the casing 10 in the longitudinal direction. In other words, the communication cable 20 is drawn out from the other end face of the casing 10 in the longitudinal direction. In the following description, the one face of the casing 10 in the longitudinal direction, from which the plug connector 11 protrudes, may be referred to as a "front face," and the other end face of the casing 10 in the longitudinal direction, into which the communication cable 20 is drawn, maybe referred to as a "rear face." That is, in the present embodiment, the plug connector 11 protrudes from the front face of the casing 10, while the communication cable 20 is drawn in from the rear face of the casing 10.

The plug connector 11 is a card edge connector formed on one side of a board (module board) housed inside the casing 10. In addition, a boot 21 extending over the inside and outside of the casing 10 is attached to the end (root) of the communication cable 20 drawn into the inside of the casing 10 from the rear face of the casing 10, and a part of the boot 21 protrudes rearward from the rear face of the casing 10.

A pair of latch arms 14 is disposed on both side surfaces of the casing 10. The latch arm 14 extends along the side surface of the casing 10, and an operating portion 15 operating a locking piece disposed in the slot is provided at the tip of the latch arm 14. When the communication module 1 (casing 10) is inserted into the slot, the locking piece disposed on a side wall of the slot is locked to the casing 10, so that the communication module 1 (casing 10) cannot be pulled out from the slot. The locking piece is formed by bending a part of the sheet metal forming the slot and is locked to the casing 10 by its own elastic force.

Meanwhile, the latch arm 14 including the operating portion 15 is slidably held along the side surface of the casing 10. When the latch arm 14 is operated so as to slide, the locking piece is pushed outward by the operating portion 15, so that the engagement between the locking piece and the casing 10 is released, and the communication module 1 (casing 10) can be removed from the slot. To be more specific, when the latch arm 14 is pulled rearward with a predetermined force or more, the engagement between the locking piece and the casing 10 is released.

As shown in FIG. 1, rear ends of the pair of latch arms 14 are connected to each other by a connecting portion 14a. Therefore, the pair of latch arms 14 slides back and forth together in an integrated manner. A grip portion 16 is formed integrally with the connecting portion 14a connecting the two latch arms 14. That is, the grip portion 16 is connected to the latch arm 14, and the latch arm 14 can be slidably operated by using the grip portion 16. The grip portion 16 in this embodiment is made of metal and has a round bar shape. In addition, the grip portion 16 extends straight from the center in the width direction of the connecting portion 14a toward the rear and has sufficient rigidity such that the grip portion 16 is not bent by the weight of the casing 10 including the module board and the like. In other words, the grip portion 16 has sufficient rigidity to support the casing 10. Therefore, the casing 10 containing the module board and the like can be supported by holding an end portion 16a of the grip portion 16, and when the end portion 16a of the grip portion 16 is held, the grip portion 16 will not be bent or broken due to the weight of the casing 10.

Figure 2:
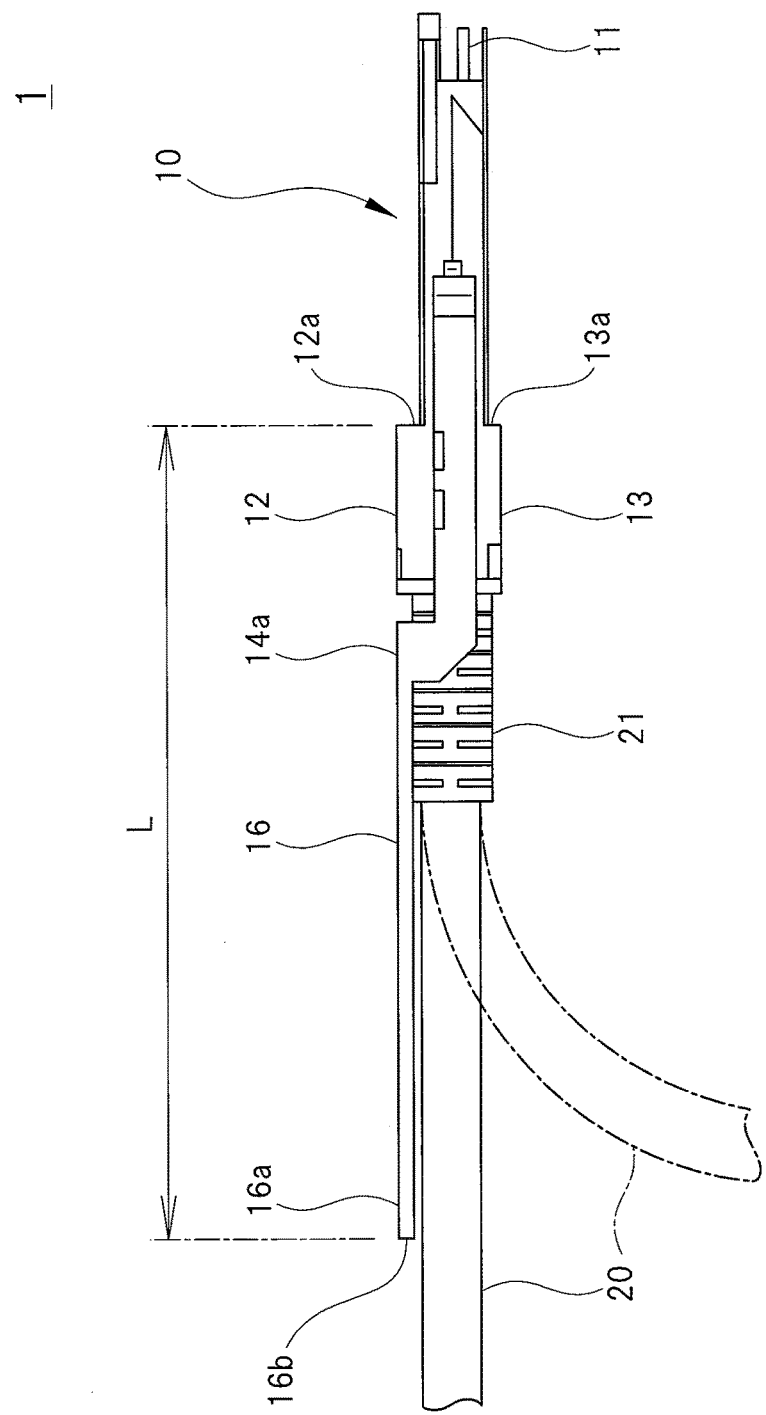
FIG. 2 is a side view of the communication module shown in FIG. 1.

As shown in FIG. 1, when the communication cable 20 drawn out from the rear face of the casing 10 is extended straight, the grip portion 16 is parallel or substantially parallel to the communication cable 20. However, while the grip portion 16 having the above-described rigidity can keep its own shape, the communication cable 20 has flexibility and is also bent even under its own weight. Here, the boot 21 is attached to the root of the communication cable 20, and the boot 21 has higher rigidity than the communication cable 20. Therefore, as shown in FIG. 2, when the communication module 1 (casing 10) is inserted into the slot and held horizontally, a portion protruding from the rear end face of the boot of the communication cable 20 hangs down. Actually, although the boot 21 also hangs down a little, its degree is slight as compared to the communication cable 20, and accordingly, the hanging of the boot 21 is not shown in FIG. 2.

It is preferable that a length (L) of the grip portion 16 shown in FIG. 2 is such a length that the grip portion 16 is not buried in a communication cable hanging down from another communication module inserted in a surrounding slot. From this viewpoint, a length (L) of the grip portion 16 is preferably 50 mm or more, and the length (L) of the grip portion 16 in the present embodiment is 50 mm. In addition, it is preferable that a width (W1) of the grip portion 16 shown in FIG. 1 is narrower than a width (W2) of the casing 10. The width (W1) of the grip portion 16 in the present embodiment is narrower than the width (W2) of the casing 10 and further narrower (thinner) than a diameter (D) of the communication cable 20.

In a case where the width (W1) of the grip portion 16 is narrower than the width (W2) of the casing 10, even when another communication module has already been inserted in a surrounding slot, a space for inserting a finger between the grip portion 16 and another communication module is ensured, and operability at the time of inserting and removing the communication module 1 into/from the slot is improved.

Further, when the width (W1) of the grip portion 16 is narrower (thinner) than the diameter (D) of the communication cable 20, a space for routing the communication cable 20 at its root or the vicinity of the root is secured, and a routing property of the communication cable 20 is improved.

As is apparent from FIG. 2, the length (L) of the grip portion 16 is the length from the end surface 12a of the upper protrusion 12 and the end surface 13a of the lower protrusion 13, which define the insertion length of the communication module 1 with respect to the slot, to an end face 16b of the grip portion 16. In other words, the length (L) of the grip portion 16 corresponds to a protruding length of the communication module 1 with respect to the panel. Note that the length (L) of the grip portion 16 is a length in a state where the grip portion 16 is not pulled.

As described above, the communication module 1 according to the present embodiment has the grip portion 16 having sufficient rigidity to support the casing 10, and the length (L) so as not to be buried in a communication cable extending from another communication module inserted in a surrounding slot. Therefore, even under a circumstance where another communication module has already been inserted into a slot around the target slot, the communication module 1 can be inserted into the target slot by holding the end portion 16a of the grip portion 16. In other words, the communication module 1 can be inserted into the target slot without applying force to the connection portion between the communication cable 20 and the board. In particular, since the grip portion 16 in this embodiment has a round bar shape, the communication module 1 can be easily and reliably inserted into a slot to a predetermined position by pushing the end face 16b of the grip portion 16 after inserting the tip of the communication module 1 into the slot.

In addition, the grip portion 16 can be pulled straight even under the circumstance where another communication module has been inserted in a slot around the slot in which the communication module 1 has been inserted, and thus, the communication module 1 can be easily and reliably pulled out from the slot. In particular, since the grip portion 16 in this embodiment has a round bar shape, it is difficult for the communication cable extending from the communication module inserted in a surrounding slot to be caught by the grip portion 16, and bending and twisting of the grip portion 16 can be effectively prevented.

The present invention is not to be limited to the above-described embodiment and may be modified in various ways within a scope not deviating from the gist thereof. For example, as long as the grip portion 16 has predetermined rigidity, it may be made of synthetic resin instead of metal. Further, the grip portion 16 separated from the latch arm 14 may be fixed to the connecting portion 14a of the latch arm 14 or the casing 10.

Figure 3:
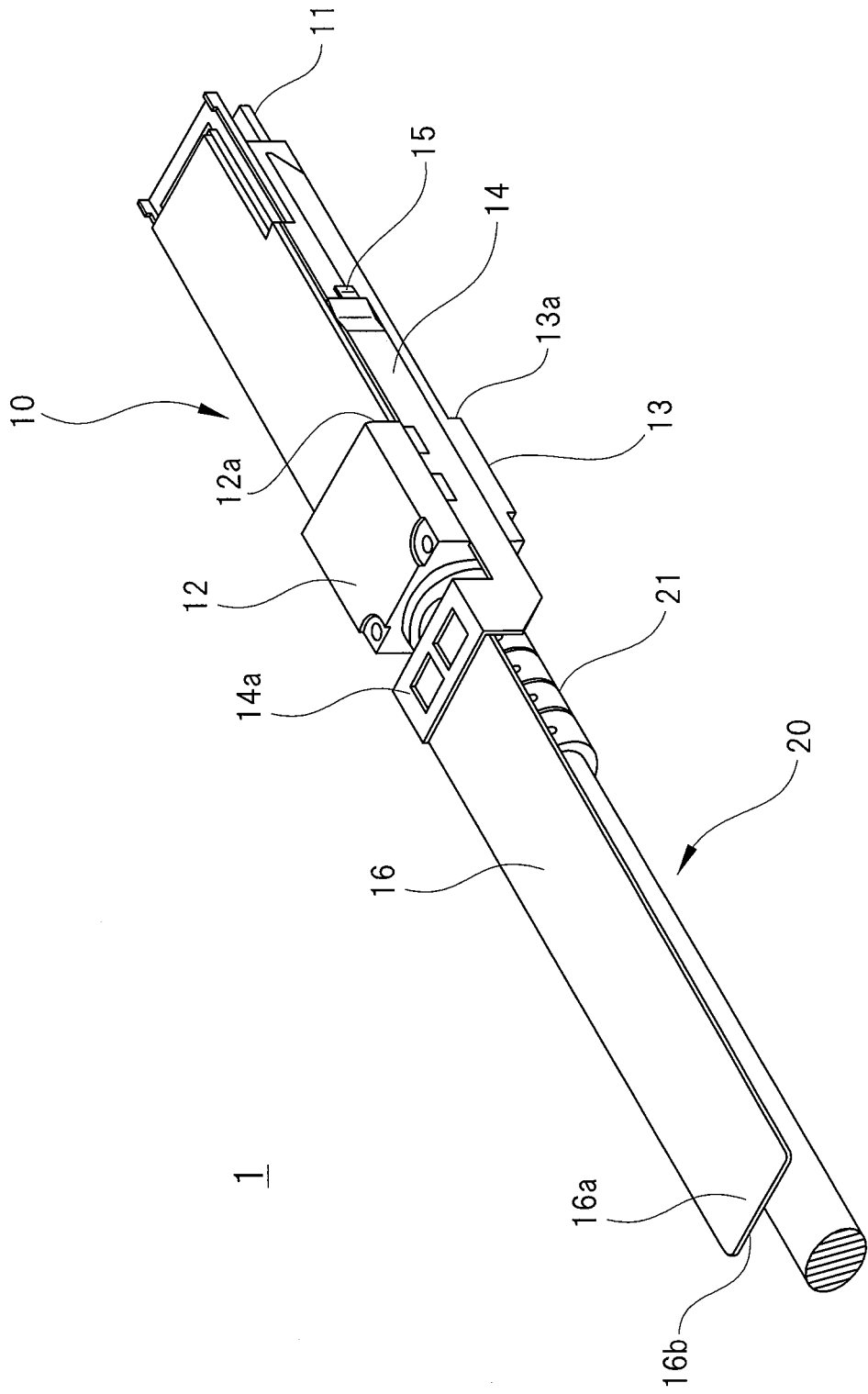
FIG. 3 is a perspective view showing another example of a communication module to which the present invention is applied.
Figure 4:
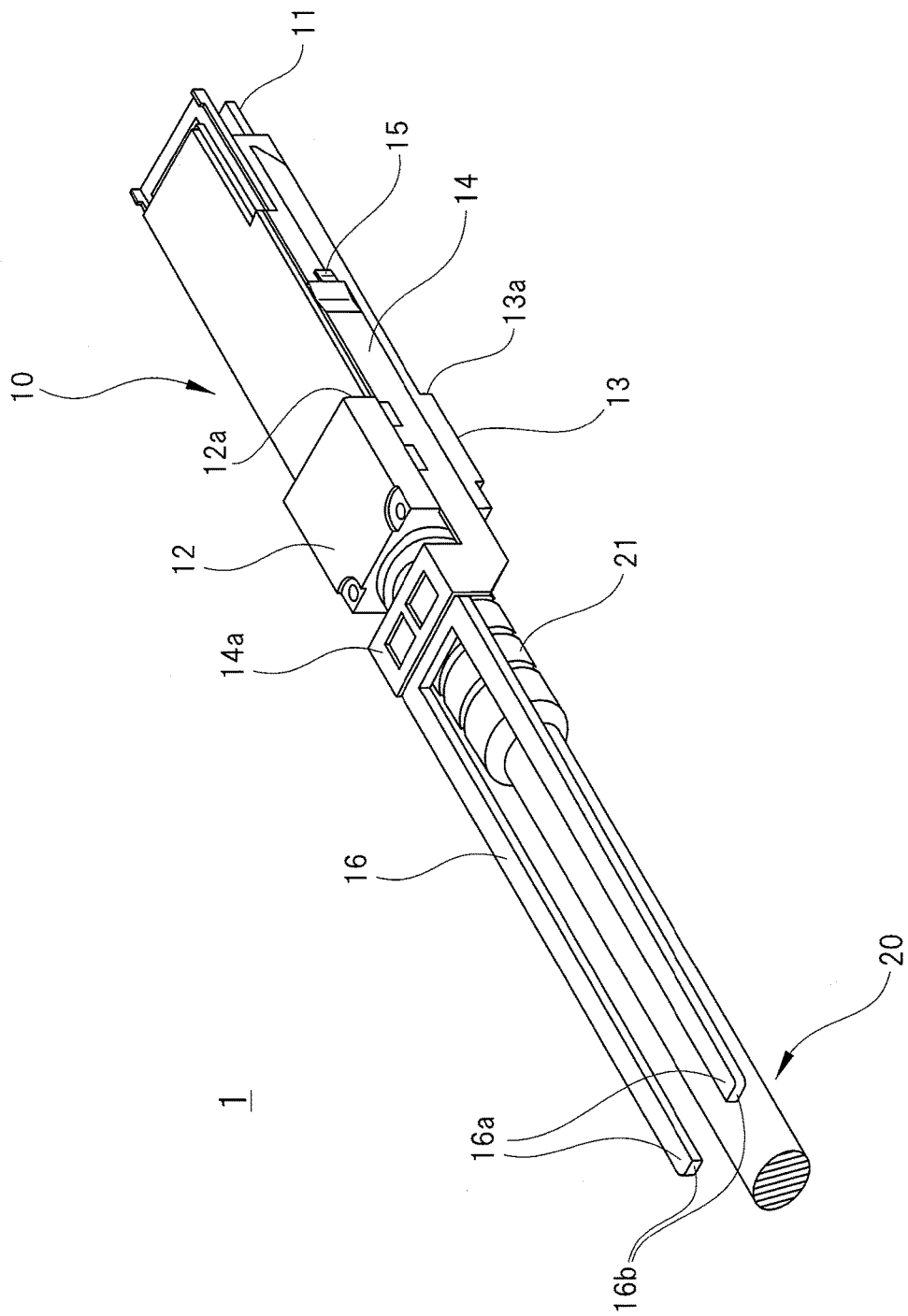
FIG. 4 is a perspective view showing still another example of a communication module to which the present invention is applied.
Figure 5:
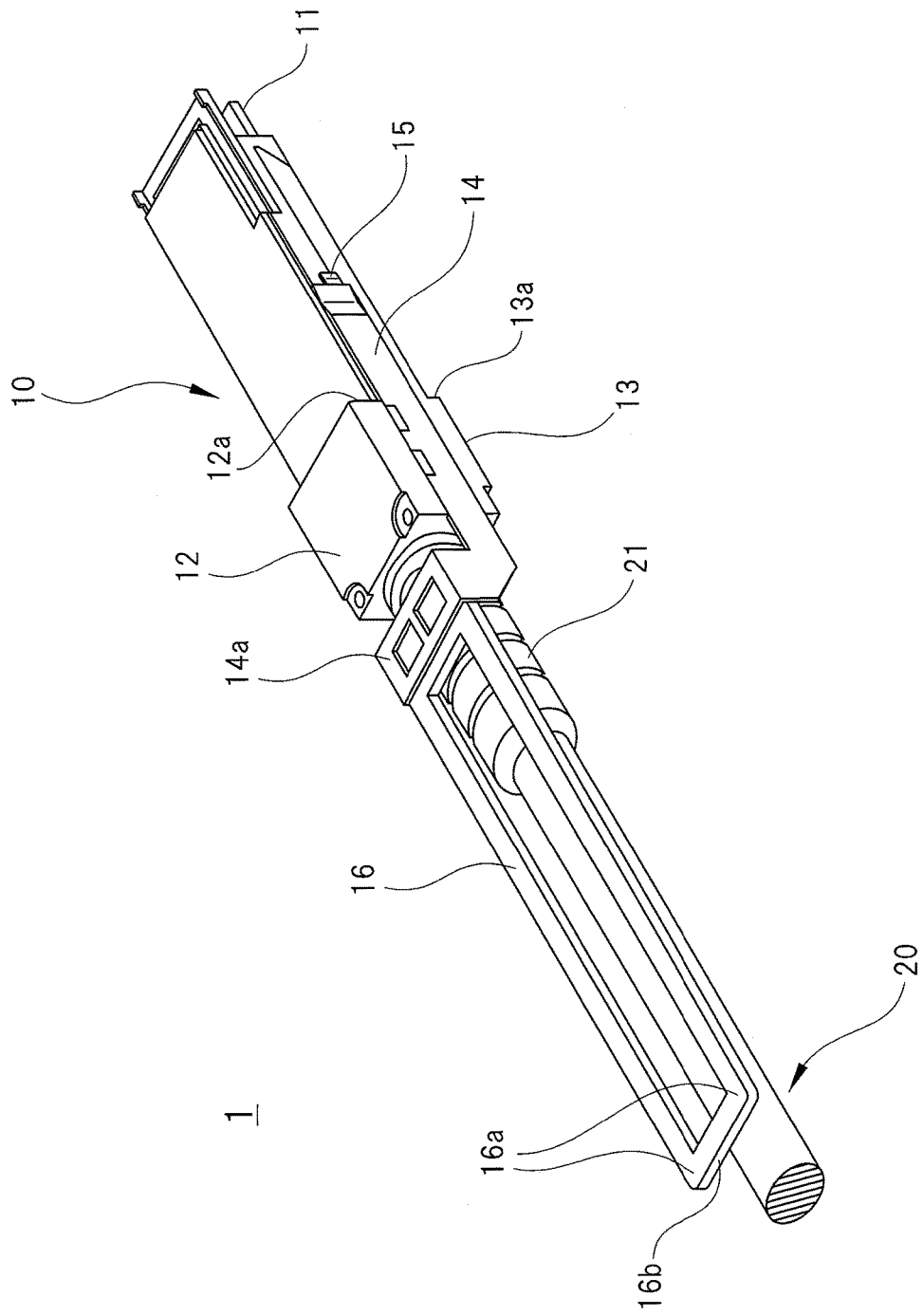
FIG. 5 is a perspective view showing still further another example of a communication module to which the present invention is applied.

A shape and dimensions of the grip portion 16 can be appropriately changed. For example, when the grip portion 16 has a bar shape, its cross-sectional shape is not limited to a circle but may be an elliptical shape, a triangular shape, or other polygonal shape. Further, the shape of the grip portion 16 can be changed to a flat plate shape as shown in FIG. 3. In addition, the shape of the grip portion 16 can also be changed to a U shape as shown in FIG. 4 or a rectangular shape as shown in FIG. 5. In the case of the U-shaped grip portion 16 as shown in FIG. 4 or the rectangular grip portion 16 as shown in FIG. 5, since a thickness of the grip portion 16 can be increased while avoiding interference with the communication cable 20, the rigidity of the grip portion 16 can be easily increased.

In the present specification, an example of an embodiment of the present invention has been described by taking the direct attach cable as an example. However, the present invention can also be applied to a communication module other than the direct attach cable type, and even in this case, the same effect as described above can be obtained. For example, the present invention can also be applied to an optical transceiver having an insertion port (receptacle) capable of insertion and removal of an optical connector provided at a tip of an optical fiber cable. Further, the present invention can also be applied to an active optical cable (AOC). That is, the present invention can be applied also to a communication module in which a communication cable is fixed to a casing, and also to a communication module in which a communication cable can be attached to and detached from a casing. In addition, the present invention can be applied also to a communication module with a photoelectric conversion function, and also to a communication module without a photoelectric conversion function.

What is claimed is:

1. A communication module inserted into and removed from a slot provided in a communication device, the communication module comprising:
   a communication cable;
   a casing disposed at an end of the communication cable and capable of being inserted into and removed from the slot;
   a latch arm slidable along the casing; and a grip portion extending from the casing,
wherein, when the latch arm is operated so as to slide, an engagement between the casing and the slot is released, and
the grip portion is connected to the latch arm such that the latch arm can be operated so as to slide, and the grip portion also has rigidity so as not to be bent by a weight of the casing when the end portion of the grip portion is held and is capable of inserting the casing into the slot to a predetermined position by pushing an end face of the grip portion.

2. The communication module according to claim 1,
wherein the grip portion is made of metal and is integrally molded with the latch arm.

3. The communication module according to claim 1,
wherein the grip portion is made of synthetic resin and is fixed to the latch arm.

4. The communication module according to claim 1,
wherein the grip portion has a round bar shape smaller than the communication cable in diameter.

5. The communication module according to claim 1,
wherein the grip portion has a length such that a protruding length of the grip portion with respect to a panel provided with the slot is 50 mm or more when the casing is inserted into the slot.

* * * * *